US011175446B1

(12) United States Patent
Li et al.

(10) Patent No.: US 11,175,446 B1
(45) Date of Patent: Nov. 16, 2021

(54) BACKLIGHT MODULE AND DISPLAY DEVICE

(71) Applicant: Wuhan China Star Optoelectronics Technology Co., Ltd., Wuhan (CN)

(72) Inventors: Shengming Li, Wuhan (CN); Qing Guo, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 267 days.

(21) Appl. No.: 16/487,614

(22) PCT Filed: Apr. 15, 2019

(86) PCT No.: PCT/CN2019/082599
§ 371 (c)(1),
(2) Date: Aug. 21, 2019

(87) PCT Pub. No.: WO2020/124891
PCT Pub. Date: Jun. 25, 2020

(30) Foreign Application Priority Data

Dec. 21, 2018 (CN) .......................... 201811574393.1

(51) Int. Cl.
*G02F 1/13357* (2006.01)
*F21V 8/00* (2006.01)

(52) U.S. Cl.
CPC .......... *G02B 6/0066* (2013.01); *G02B 6/0051* (2013.01); *G02B 6/0055* (2013.01); *G02B 6/0088* (2013.01); *G02B 6/0093* (2013.01)

(58) Field of Classification Search
CPC .. G02B 6/0088; G02B 6/0055; G02B 6/0051; G02B 6/0066; G02B 6/0093; G02F 1/133311
See application file for complete search history.

(56) References Cited

U.S. PATENT DOCUMENTS 9,658,392 B2 *  5/2017  Zhang ................ G02B 6/0055

FOREIGN PATENT DOCUMENTS

| CN | 204083998 U |   | 1/2015 |
| CN | 206057755 U |   | 3/2017 |
| CN | 108227304 A | * | 6/2018 |
| CN | 207817367 U |   | 9/2018 |
| JP | 2015114382 A |  | 6/2015 |

* cited by examiner

*Primary Examiner* — Karabi Guharay

(57) ABSTRACT

Provided are a backlight module and a display device. The backlight module includes a back plate, a sealant and a light source portion. The sealant includes a first surface with an inclined angle. The light source portion includes a circuit board and a light source. A first end of the circuit board is disposed on the first surface, and a second end of the circuit board is disposed on the light guide plate. The circuit board is obliquely disposed on the sealant and the light guide plate.

20 Claims, 1 Drawing Sheet

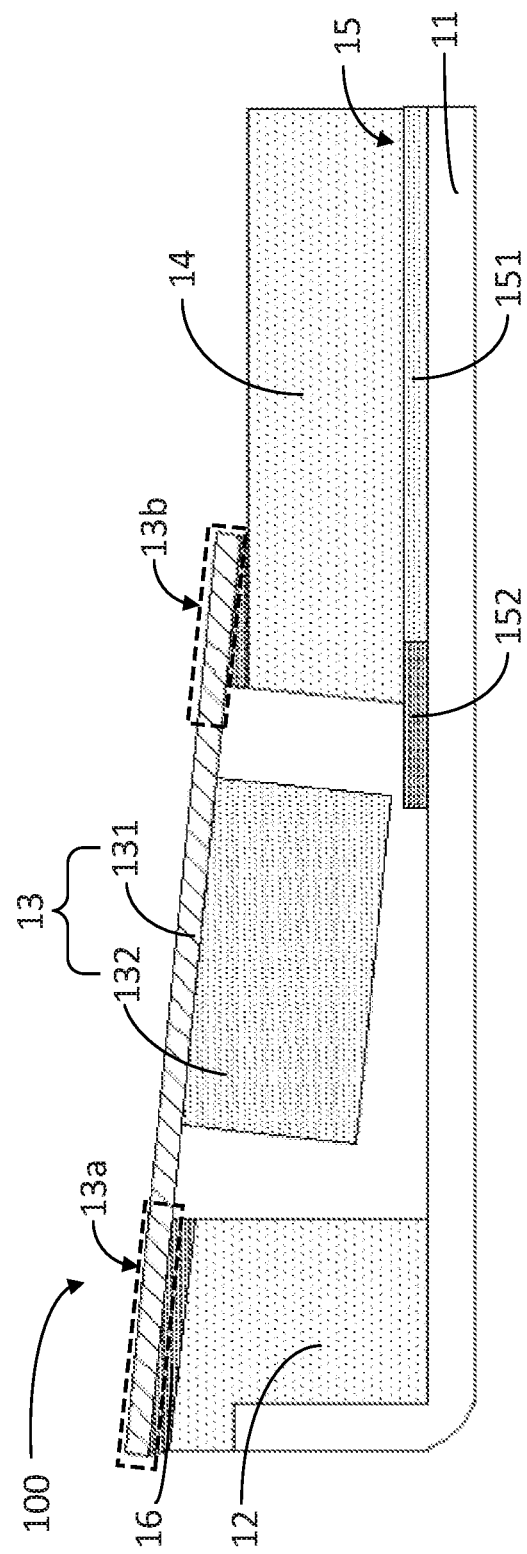

BACKLIGHT MODULE AND DISPLAY DEVICE

FIELD OF THE INVENTION

The present application relates to a display field, and more particularly to a backlight module and a display device.

BACKGROUND OF THE INVENTION

As a flat panel display device, TFT-LCD (Thin Film Transistor Liquid Crystal Display) possesses features due to its small size, low power consumption, no radiation and relatively low manufacturing cost, thus the display device is utilized in the field of high performance display, more and more.

The backlight module is a light source fixed to the rear of the liquid crystal display. The lighting effect of the backlight module will directly affect the visual effect of the liquid crystal display. With the development of technology, the market demand for liquid crystal displays is getting higher and higher, which in turn increases the requirements for backlight modules. The screen area ratio of the light emitting area of the backlight module is an important parameter for measuring the quality of the backlight module. Since the light source possesses a fixed light emitting angle and the light of the light source has a certain light mixing distance, if the distance between the light emitting area of the backlight module and the light emitting surface of the light source is too small, the optical performance of the light source is poor. Furthermore, the light source is fixed by the circuit board, and one side of the circuit board is bonded to the upper surface of the sealant. If the bonding area of the circuit board is too small, the problem of separation of the circuit board and the sealant may easily occur.

There is a need for a backlight module and a display device to solve the aforesaid problems.

SUMMARY OF THE INVENTION

The present application provides a backlight module and a display device to solve the problem that the light source mixing distance is short and the bonding area of the sealant and the circuit board is small in the backlight module.

To solve the aforesaid problem, the technical solution of the present application is described as follows:

First, the present application provides a backlight module, including a back plate, and a sealant, a light guide plate and a light source portion disposed on an inner side of the back plate;

wherein the sealant is disposed at an inner edge of the back plate, and the sealant includes a first surface with an inclined angle;

the light guide plate is disposed at one side of the sealant;

the light source portion includes a circuit board and at least one light source disposed on one side surface of the circuit board;

a first end of the circuit board is disposed on the first surface, and a second end of the circuit board is disposed on the light guide plate;

the light source is disposed in a gap between the sealant and the light guide plate;

wherein the circuit board is obliquely disposed on the sealant and the light guide plate, and the first end of the circuit board is higher than the second end of the circuit board.

In the backlight module of the present application, an inclined angle of the first surface is same as an oblique angle of the circuit board.

In the backlight module of the present application, the backlight module further includes an adhesive tape, and the circuit board is fixed on the sealant and the light guide plate by the adhesive tape.

In the backlight module of the present application, the light source is a side light emitting light source, and a light emitting surface of the light source is a side surface of the light source, and the light emitting surface of the light source is disposed perpendicular to the circuit board.

In the backlight module of the present application, the light guide plate includes a light incident surface, and the light incident surface of the light guide plate is disposed in parallel with the light emitting surface of the light source.

In the backlight module of the present application, the backlight module further includes a reflective layer disposed between the light guide plate and the back plate.

In the backlight module of the present application, the reflective layer protrudes from the light incident surface of the light guide plate;

wherein the reflective layer includes a reflective region and a diffusion region for enhancing light diffusion, and the diffusion region is disposed at the light incident surface of the light guide plate.

In the backlight module of the present application, the backlight module further includes a diffusion layer disposed between the light guide plate and the back plate, and the diffusion layer is disposed at the light incident surface of the light guide plate.

In the backlight module of the present application, the light guide plate includes a light emitting area and a non-light emitting area, and the light emitting area is disposed at one end of the light guide plate close to the light source;

the backlight module further includes a light shielding glue disposed on the circuit board and the light guide plate and covering a non-light emitting area of the light guide plate.

In the backlight module of the present application, the circuit board is a flexible circuit board.

Second, the present application further provides a display device, including a display module and a backlight module, wherein the backlight module includes a back plate, and a sealant, a light guide plate and a light source portion disposed on an inner side of the back plate;

wherein the sealant is disposed at an inner edge of the back plate, and the sealant includes a first surface with an inclined angle;

the light guide plate is disposed at one side of the sealant;

the light source portion includes a circuit board and at least one light source disposed on one side surface of the circuit board;

a first end of the circuit board is disposed on the first surface, and a second end of the circuit board is disposed on the light guide plate;

the light source is disposed in a gap between the sealant and the light guide plate;

wherein the circuit board is obliquely disposed on the sealant and the light guide plate, and the first end of the circuit board is higher than the second end of the circuit board.

In the display device of the present application, an inclined angle of the first surface is same as an oblique angle of the circuit board.

In the display device of the present application, the backlight module further includes an adhesive tape, and the circuit board is fixed on the sealant and the light guide plate by the adhesive tape.

In the display device of the present application, the light source is a side light emitting light source, and a light emitting surface of the light source is a side surface of the light source, and the light emitting surface of the light source is disposed perpendicular to the circuit board.

In the display device of the present application, the light guide plate includes a light incident surface, and the light incident surface of the light guide plate is disposed in parallel with the light emitting surface of the light source.

In the display device of the present application, the backlight module further includes a reflective layer disposed between the light guide plate and the back plate.

In the display device of the present application, the reflective layer protrudes from the light incident surface of the light guide plate;

wherein the reflective layer includes a reflective region and a diffusion region for enhancing light diffusion, and the diffusion region is disposed at the light incident surface of the light guide plate.

In the display device of the present application, the backlight module further includes a diffusion layer disposed between the light guide plate and the back plate, and the diffusion layer is disposed at the light incident surface of the light guide plate.

In the display device of the present application, the light guide plate includes a light emitting area and a non-light emitting area, and the light emitting area is disposed at one end of the light guide plate close to the light source;

the backlight module further includes a light shielding glue disposed on the circuit board and the light guide plate and covering a non-light emitting area of the light guide plate.

In the display device of the present application, the circuit board is a flexible circuit board.

The benefits are: the circuit board is obliquely disposed in the backlight module in the present application to reduce the light mixing distance of the light source, to increase the bonding area of the sealant and the circuit board, and to improve a screen ratio of the light emitting area of the backlight module.

BRIEF DESCRIPTION OF THE DRAWINGS

In order to more clearly illustrate the embodiments of the present invention and the prior art, the following FIGURES will be described in the embodiments and the prior art are briefly introduced. It is obvious that the drawings are only some embodiments of the present invention, those of ordinary skill in this field can obtain other FIGURES according to these FIGURES without paying the premise.

The FIGURE is a cross-sectional view of a backlight module according to a first embodiment of the present application.

DETAILED DESCRIPTION OF PREFERRED EMBODIMENTS

The following descriptions for the respective embodiments are specific embodiments capable of being implemented for illustrations of the present application with referring to appended FIGURES. The terms of up, down, front, rear, left, right, interior, exterior, side, etcetera mentioned in the present application are merely directions of referring to appended FIGURES. Thus, the used directional terms are used to describe and understand the present application, but the present invention is not limited thereto. In the FIGURE, units with similar structures are denoted by the same reference numerals.

The present application provides a backlight module and a display device to solve the problem that the light source mixing distance is short and the bonding area of the sealant and the circuit board is small in the backlight module.

Please refer to the FIGURE. The FIGURE is a cross-sectional view of a backlight module 100 according to a first embodiment of the present application.

First, the present application provides a backlight module 100, including a back plate 11, and a sealant 12, a light guide plate 14 and a light source portion 13 disposed on an inner side of the back plate 11;

In one embodiment, the back plate 11 includes a bottom wall portion and a side wall portion constituting an accommodating space, and the light guide plate 14, the sealant 12 and the light source 13 can be accommodated in the accommodating space.

In one embodiment, the back plate 11 is a metal back plate 11, and the metal back plate 11 with better heat dissipation effect is more advantageous for achieving heat dissipation of the backlight module 100.

The sealant 12 is disposed at an inner edge of the back plate 11, and the sealant 12 includes a first surface with an inclined angle. The inclined angle of the first surface is β.

In one embodiment, the sealant 12 is disposed at the intersection of the bottom wall portion and the side wall portion.

The light guide plate 14 is disposed at one side of the sealant 12. The light guide plate 14 is disposed on the same plane as the sealant 12, and the plane is parallel to the plane at the bottom wall of the back plate 11.

The light source portion 13 includes a circuit board 131 and at least one light source 132 disposed on one side surface of the circuit board 131.

In one embodiment, the light source 132 includes light emitting diode lamps.

In one embodiment, the light source 132 is a side light emitting light source, and a light emitting surface of the light source 132 is a side surface of the light source 132, and the light emitting surface of the light source 132 is disposed perpendicular to the circuit board 131.

In one embodiment, in order to reduce the consumption of light energy due to the change of the angle of the light emitting surface of the light source 132, the light incident surface of the light guide plate 14 is disposed in parallel with the light emitting surface of the light source 132.

In one embodiment, the backlight module 100 further includes a reflective layer 15 disposed between the light guide plate 14 and the back plate 11.

In one embodiment, the reflective layer 15 protrudes from the light incident surface of the light guide plate 14.

The reflective layer 15 includes a reflective region 151 and a diffusion region 152 for enhancing light diffusion, and the diffusion region 152 is disposed at the light incident surface of the light guide plate 14 to diffuse the light and to improve the uniformity of light lat the light incident side.

In one embodiment, the backlight module 100 further includes a diffusion layer disposed between the light guide plate 14 and the back plate 11, and the diffusion layer is disposed at the light incident surface of the light guide plate 14 to diffuse the light and to improve the uniformity of light lat the light incident side.

The top surface of the light source 132 faces the bottom wall portion of the back plate 11.

In one embodiment, the circuit board 131 is a strip-shaped circuit board 131, such as a strip-shaped FPC (Flexible Printed Circuit) board 131 or a PCB (Printed Circuit Board).

A first end 13a of the circuit board 131 is disposed on the first surface, and a second end 13b of the circuit board 131 is disposed on the light guide plate 14. It can also be understood that the circuit board 131 is fixed on the sealant 12 and the light guide plate 14 with the first end 13a and the second end 13b.

The light source 132 is disposed in a gap between the sealant 12 and the light guide plate 14.

The circuit board 131 is obliquely disposed on the sealant 12 and the light guide plate 14, and the first end 13a of the circuit board 131 is higher than the second end 13b of the circuit board 131.

In a backlight module 100 of the prior art, a contact surface of the sealant 12 and the circuit board 131 is a plane. However, in the present application, the first surface of the sealant 12 in contact with the circuit board 131 is an inclined surface. In the condition that a width of the framed surface is ensured, the inclined surface can make more contact areas between the sealant 12 and the circuit board 131 than the plane, thereby improving the adhesion between the sealant 12 and the circuit board 131.

For instance, as the inclined angle of the first surface is β, and C is a pasting length of the circuit board 131 and the sealant 12 when the circuit board 131 is leveled, and C1 is a pasting length of the circuit board 131 and the sealant 12 as the circuit board 131 is obliquely disposed. Then, C1=C/cos β, and an increased amount in the pasting length of the sealant 12 and the circuit board 131 is ΔC=C1−C=C1*(1−cos β).

In the backlight module 100, the lens refracts the light of the light source 132 and then emits the light to the diffusing plate, and it is required a longer mixing distance for the light scattered by the light source 132 through the lens uniformly to cover the diffusing plate. In the present application, the circuit board 131 is obliquely disposed in the backlight module 100; accordingly, the angle of the light emitted by the light source 132 is also changed.

For instance, L is a light mixing distance as the circuit board 131 is horizontally leveled, and L1 is a light emitting diode (LED) light mixing distance as the circuit board 131 is inclined and L1=L*cos β, and the reduced amount of the LED light mixing distance, as the light bar is obliquely assembled, is ΔL=L−L1=L*(1−cos β). Therefore, the present application can reduce the light mixing distance of the light source 132.

In one embodiment, an inclined angle of the first surface is the same as an oblique angle of the circuit board 131.

In one embodiment, the backlight module 100 further includes an adhesive tape 16, and the circuit board 131 is fixed on the sealant 12 and the light guide plate 14 by the adhesive tape.

In one embodiment, the light guide plate 14 includes a light emitting area and a non-light emitting area, and the light emitting area is disposed at one end of the light guide plate 14 close to the light source 132.

The backlight module 100 further includes a light shielding glue disposed on the circuit board 131 and the light guide plate 14 and covering a non-light emitting area of the light guide plate 14.

The foregoing solution of the present application can improve the proportion of the light emitting area of the light guide plate 14 in the backlight module 100 and improve the light emitting efficiency of the backlight module 100.

Second, the present application further provides a display device, including a display module and a backlight module 100. The backlight module 100 includes a back plate 11, and a sealant 12, a light guide plate 14 and a light source portion 13 disposed on an inner side of the back plate 11.

The sealant 12 is disposed at an inner edge of the back plate 11, and the sealant 12 includes a first surface with an inclined angle;

the light guide plate 14 is disposed at one side of the sealant 12;

the light source portion 13 includes a circuit board 131 and at least one light source 132 disposed on one side surface of the circuit board 131;

a first end 13a of the circuit board 131 is disposed on the first surface, and a second end 13b of the circuit board 131 is disposed on the light guide plate 14;

the light source 132 is disposed in a gap between the sealant 12 and the light guide plate 14;

wherein the circuit board 131 is obliquely disposed on the sealant 12 and the light guide plate 14, and the first end 13a of the circuit board 131 is higher than the second end 13b of the circuit board 131.

In one embodiment, an inclined angle of the first surface is the same as an oblique angle of the circuit board 131.

In one embodiment, the backlight module 100 further includes an adhesive tape 16, and the circuit board 131 is fixed on the sealant 12 and the light guide plate 14 by the adhesive tape.

In one embodiment, the light source 132 is a side light emitting light source 132, and a light emitting surface of the light source 132 is a side surface of the light source 132, and the light emitting surface of the light source 132 is disposed perpendicular to the circuit board 131.

In one embodiment, the light guide plate 14 includes a light incident surface, and the light incident surface of the light guide plate 14 is disposed in parallel with the light emitting surface of the light source 132.

In one embodiment, the backlight module 100 further includes a reflective layer 15 disposed between the light guide plate 14 and the back plate 11.

In one embodiment, the reflective layer 15 protrudes from the light incident surface of the light guide plate 14.

The reflective layer 15 includes a reflective region 151 and a diffusion region 152 for enhancing light diffusion, and the diffusion region 152 is disposed at the light incident surface of the light guide plate 14.

In one embodiment, the backlight module 100 further includes a diffusion layer disposed between the light guide plate 14 and the back plate 11, and the diffusion layer is disposed at the light incident surface of the light guide plate 14.

In one embodiment, the light guide plate 14 includes a light emitting area and a non-light emitting area, and the light emitting area is disposed at one end of the light guide plate 14 close to the light source 132.

The backlight module 100 further includes a light shielding glue disposed on the circuit board 131 and the light guide plate 14 and covering a non-light emitting area of the light guide plate 14.

The benefits are: the circuit board is obliquely disposed in the backlight module in the present application to reduce the light mixing distance of the light source, to increase the bonding area of the sealant and the circuit board, and to improve a screen ratio of the light emitting area of the backlight module.

In summary, although the above preferred embodiments of the present application are disclosed, the foregoing preferred embodiments are not intended to limit the invention, those skilled in the art can make various kinds of alterations and modifications without departing from the spirit and scope of the present application. Thus, the scope of protection of the present application is defined by the scope of the claims.

What is claimed is:

1. A backlight module, including a back plate, and a sealant, a light guide plate and a light source portion disposed on an inner side of the back plate;
    wherein the sealant is disposed at an inner edge of the back plate, and the sealant includes a first surface with an inclined angle;
    the light guide plate is disposed at one side of the sealant;
    the light source portion includes a circuit board and at least one light source disposed on one side surface of the circuit board;
    a first end of the circuit board is disposed on the first surface, and a second end of the circuit board is disposed on the light guide plate;
    the light source is disposed in a gap between the sealant and the light guide plate;
    wherein the circuit board is obliquely disposed on the sealant and the light guide plate, and the first end of the circuit board is higher than the second end of the circuit board.

2. The backlight module according to claim 1, wherein the inclined angle of the first surface is same as an oblique angle of the circuit board.

3. The backlight module according to claim 2, wherein the light source is a side light emitting light source, and a light emitting surface of the light source is a side surface of the light source, and the light emitting surface of the light source is disposed perpendicular to the circuit board.

4. The backlight module according to claim 3, wherein the light guide plate includes a light incident surface, and the light incident surface of the light guide plate is disposed in parallel with the light emitting surface of the light source.

5. The backlight module according to claim 4, wherein the backlight module further includes a reflective layer disposed between the light guide plate and the back plate.

6. The backlight module according to claim 5, wherein the reflective layer protrudes from the light incident surface of the light guide plate;
    wherein the reflective layer includes a reflective region and a diffusion region for enhancing light diffusion, and the diffusion region is disposed at the light incident surface of the light guide plate.

7. The backlight module according to claim 4, wherein the backlight module further includes a diffusion layer disposed between the light guide plate and the back plate, and the diffusion layer is disposed at the light incident surface of the light guide plate.

8. The backlight module according to claim 1, wherein the backlight module further includes an adhesive tape, and the circuit board is fixed on the sealant and the light guide plate by the adhesive tape.

9. The backlight module according to claim 1, wherein the light guide plate includes a light emitting area and a non-light emitting area, and the light emitting area is disposed at one end of the light guide plate close to the light source;
    the backlight module further includes a light shielding glue disposed on the circuit board and the light guide plate and covering a non-light emitting area of the light guide plate.

10. The backlight module according to claim 1, wherein the circuit board is a flexible circuit board.

11. A display device, including a display module and a backlight module, wherein the backlight module includes a back plate, and a sealant, a light guide plate and a light source portion disposed on an inner side of the back plate;
    wherein the sealant is disposed at an inner edge of the back plate, and the sealant includes a first surface with an inclined angle;
    the light guide plate is disposed at one side of the sealant;
    the light source portion includes a circuit board and at least one light source disposed on one side surface of the circuit board;
    a first end of the circuit board is disposed on the first surface, and a second end of the circuit board is disposed on the light guide plate;
    the light source is disposed in a gap between the sealant and the light guide plate;
    wherein the circuit board is obliquely disposed on the sealant and the light guide plate, and the first end of the circuit board is higher than the second end of the circuit board.

12. The display panel according to claim 11, wherein the inclined angle of the first surface is same as an oblique angle of the circuit board.

13. The display panel according to claim 12, wherein the light source is a side light emitting light source, and a light emitting surface of the light source is a side surface of the light source, and the light emitting surface of the light source is disposed perpendicular to the circuit board.

14. The display panel according to claim 13, wherein the light guide plate includes a light incident surface, and the light incident surface of the light guide plate is disposed in parallel with the light emitting surface of the light source.

15. The display panel according to claim 14, wherein the backlight module further includes a reflective layer disposed between the light guide plate and the back plate.

16. The display panel according to claim 15, wherein the reflective layer protrudes from the light incident surface of the light guide plate;
    wherein the reflective layer includes a reflective region and a diffusion region for enhancing light diffusion, and the diffusion region is disposed at the light incident surface of the light guide plate.

17. The display panel according to claim 14, wherein the backlight module further includes a diffusion layer disposed between the light guide plate and the back plate, and the diffusion layer is disposed at the light incident surface of the light guide plate.

18. The display panel according to claim 11, wherein the backlight module further includes an adhesive tape, and the circuit board is fixed on the sealant and the light guide plate by the adhesive tape.

19. The display panel according to claim 11, wherein the light guide plate includes a light emitting area and a non-light emitting area, and the light emitting area is disposed at one end of the light guide plate close to the light source;
    the backlight module further includes a light shielding glue disposed on the circuit board and the light guide plate and covering a non-light emitting area of the light guide plate.

20. The display panel according to claim 11, wherein the circuit board is a flexible circuit board.

* * * * *